(12) United States Patent
Meeks

(10) Patent No.: US 11,785,919 B2
(45) Date of Patent: Oct. 17, 2023

(54) ANIMAL DRYING ASSEMBLY

(71) Applicant: Orfalina Meeks, Dallas, TX (US)

(72) Inventor: Orfalina Meeks, Dallas, TX (US)

( * ) Notice: Subject to any disclaimer, the term of this patent is extended or adjusted under 35 U.S.C. 154(b) by 93 days.

(21) Appl. No.: 17/512,167

(22) Filed: Oct. 27, 2021

(65) Prior Publication Data

US 2023/0125459 A1 Apr. 27, 2023

(51) Int. Cl.
*A01K 13/00* (2006.01)

(52) U.S. Cl.
CPC .................. *A01K 13/001* (2013.01)

(58) Field of Classification Search
CPC ...... A01K 1/04; A01K 13/004; A01K 13/003; A61D 7/00; A61D 11/00
See application file for complete search history.

(56) References Cited

U.S. PATENT DOCUMENTS

| | | | |
|---|---|---|---|
| 689,168 A * | 12/1901 | Conroy | A01K 31/18 119/491 |
| 3,108,568 A | 10/1963 | Whitney | |
| 3,596,636 A | 8/1971 | Stobaugh | |
| D308,589 S | 6/1990 | Shay | |
| 4,977,690 A | 12/1990 | Davis, Jr. | |
| 5,618,246 A * | 4/1997 | Zheng | A63B 9/00 D21/826 |
| 6,058,886 A | 5/2000 | Haines | |
| 6,560,779 B1 * | 5/2003 | Savage | A01K 13/001 2/1 |
| D501,063 S * | 1/2005 | Bertoli | D30/108 |
| 7,811,026 B1 * | 10/2010 | Kulp | E01F 9/688 116/63 C |
| 8,371,246 B1 * | 2/2013 | Streng | A01K 13/001 119/668 |
| 8,757,096 B2 | 6/2014 | Doumas | |
| 10,997,856 B2 * | 5/2021 | Lykkja | G08G 1/096758 |
| 2004/0250744 A1 * | 12/2004 | Garcia | E01F 9/629 116/63 C |
| 2005/0076822 A1 * | 4/2005 | Levine | E01F 9/688 116/63 C |
| 2006/0016383 A1 * | 1/2006 | Flamingo | E01F 9/688 116/63 C |
| 2007/0289548 A1 | 12/2007 | Smoot | |
| 2009/0173286 A1 | 7/2009 | Schetlin | |

* cited by examiner

*Primary Examiner* — Ebony E Evans

(57) ABSTRACT

An animal drying assembly for drying an animal when the animal has been bathed includes a cone that is positionable on a support surface having the cone being vertically oriented. The cone has an air opening extending therein to pass air into the cone. A member is coupled to the cone and the member is vertically coiled around the cone. The member is biased to spring upwardly thereby positioning the cone in a deployed position. A tube is coupled to the cone and the tube is aligned with the air aperture to pass air into the top end. A blower is insertable into the tube to blow air into the cone for drying the animal. A net is provided and the net is positionable to close the entry opening in the cone to inhibit the animal from exiting the cone.

10 Claims, 5 Drawing Sheets

ANIMAL DRYING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to drying devices and more particularly pertains to a new drying device for drying an animal when the animal has been bathed.

BRIEF SUMMARY OF THE INVENTION

An embodiment of the disclosure meets the needs presented above by generally comprising a cone that is positionable on a support surface having the cone being vertically oriented. The cone has an air opening extending therein to pass air into the cone. A member is coupled to the cone and the member is vertically coiled around the cone. The member is biased to spring upwardly thereby positioning the cone in a deployed position. A tube is coupled to the cone and the tube is aligned with the air aperture to pass air into the top end. A blower is insertable into the tube to blow air into the cone for drying the animal. A net is provided and the net is positionable to close the entry opening in the cone to inhibit the animal from exiting the cone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
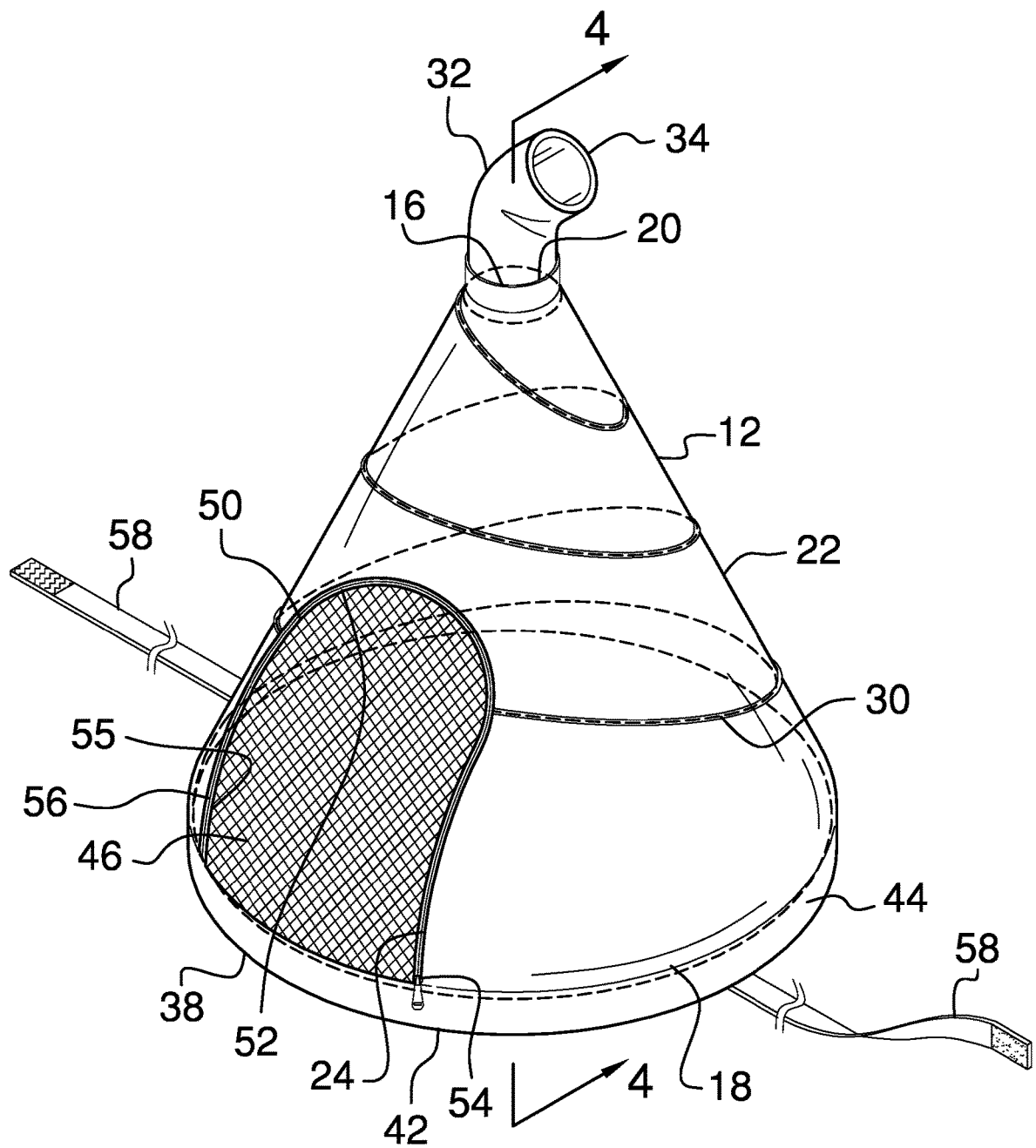
FIG. 1 is a top perspective view of a animal drying assembly according to an embodiment of the disclosure.
Figure 2:
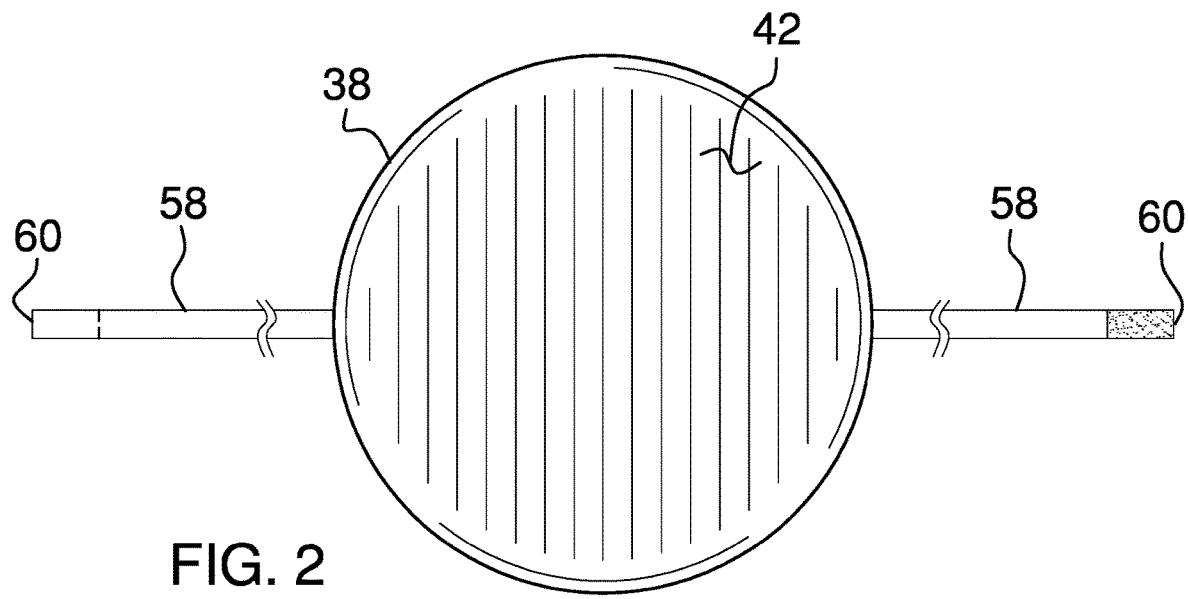
FIG. 2 is a bottom view of an embodiment of the disclosure.
Figure 3:
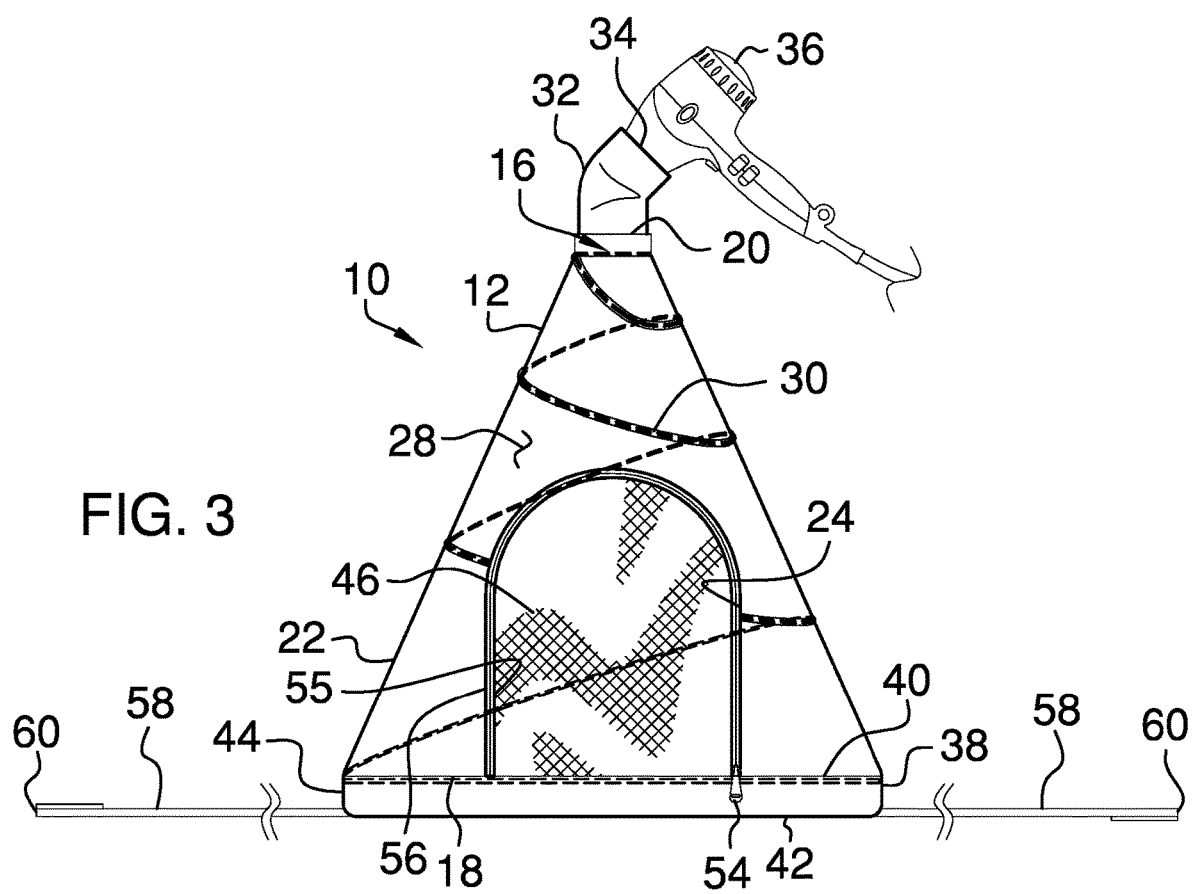
FIG. 3 is a front view of an embodiment of the disclosure.
Figure 4:
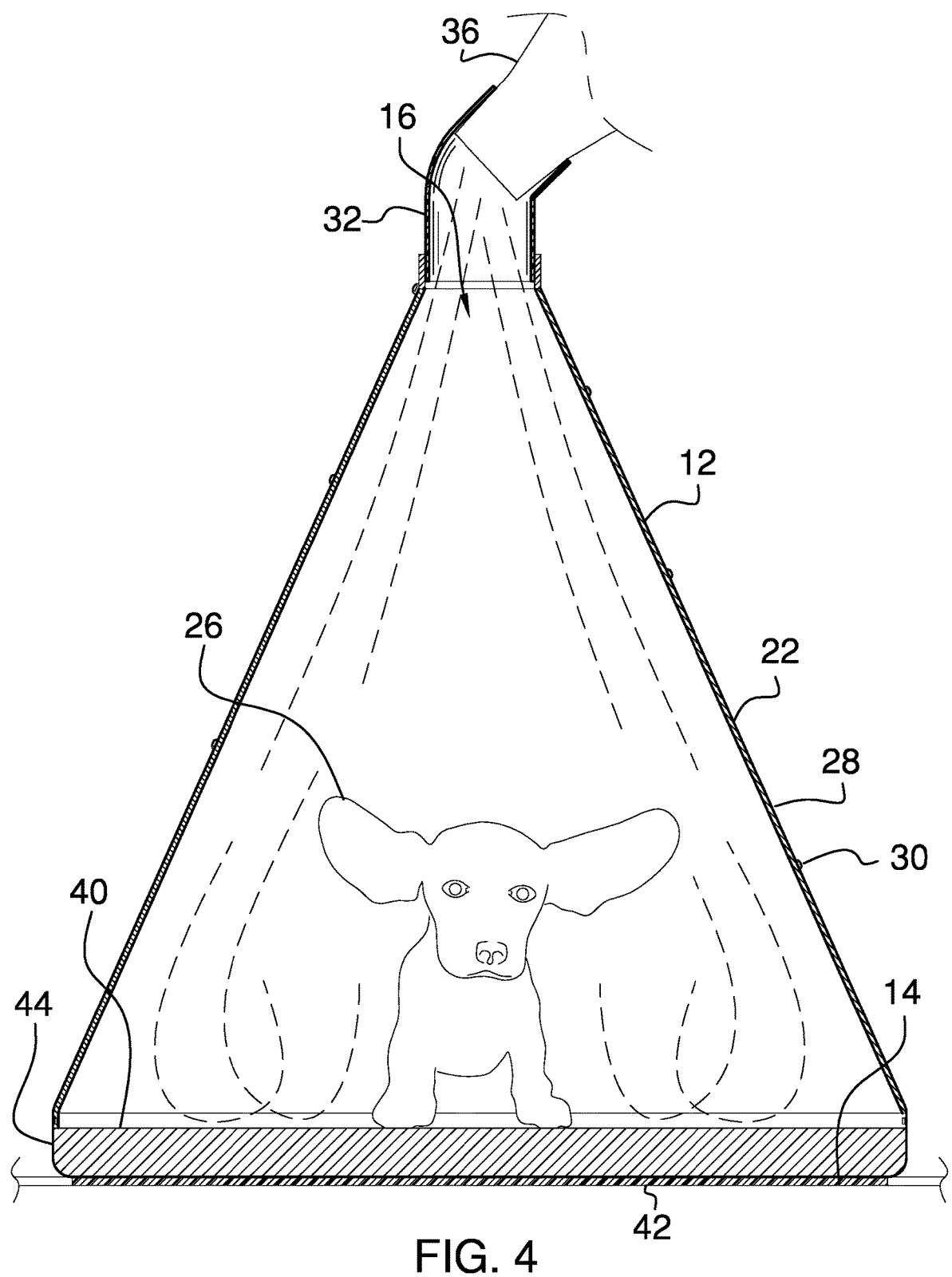
FIG. 4 is a cut-away in-use view of an embodiment of the disclosure.

With reference now to the drawings, and in particular to FIGS. 1 through 6 thereof, a new drying device embodying the principles and concepts of an embodiment of the disclosure and generally designated by the reference numeral 10 will be described.

As best illustrated in FIGS. 1 through 6, the animal drying assembly 10 generally comprises a cone 12 that is positionable on a support surface 14 having the cone 12 being vertically oriented. The cone 12 has an air opening 16 extending therein to pass air into the cone 12. The cone 12 has a bottom end 18, a top end 20 and an outer wall 22 extending therebetween. The top end 20 is open to define the air opening 16 in the top end 20 and the outer wall 22 angles outwardly between the top 20 and bottom 18 ends. The outer wall 22 has an entry opening 24 extending into an interior of the cone 12 to facilitate an animal 26 to enter the cone 12 and the outer wall 22 has an outside surface 28. The animal 26 may be a dog, a cat or other domesticated animal kept as a pet.

A member 30 is coupled to the cone 12 and the member 30 is vertically coiled around the cone 12. The member 30 is comprised of a resiliently deformable material and the member 30 is biased to spring upwardly. In this way the member 30 positions the cone 12 in a deployed position having the cone 12 extending upwardly from the support surface 14. Thus, the animal 26 can be positioned within the cone 12. The member 30 is collapsible upon itself thereby facilitating the cone 12 to be positioned in a collapsed position for storage. The member 30 is bonded to the outside surface 28 of the outer wall 22 of the cone 12 and the member 30 coils between the bottom 18 and top 20 ends of the cone 12.

A tube 32 is coupled to the cone 12 and the tube 32 is aligned with the air aperture to pass air into the top end 20. The tube 32 has a distal end 34 with respect to the top end 20 and the tube 32 curves between the top end 20 of the cone 12 and the distal end 34. A blower 36 is insertable into the tube 32 to blow air into the cone 12 for drying the animal 26. The blower 36 is insertable into the distal end 34 of the tube 32 and the blower 36 may be an electric hair dryer or other similar type of blower than can blow heated air.

A base 38 is provided and the base 38 is positionable on the support surface 14 to have the animal 26 stand thereupon. The cone 12 is coupled to and extends upwardly from the base 38 for surrounding the animal 26. The base 38 has a top surface 40, a bottom surface 42 and a peripheral edge 44 extending therebetween, and the peripheral edge 44 is continuously arcuate such that the base 38 has a circular shape. The bottom end 18 of the cone 12 is attached to the top surface 40 of the base 38. Moreover, the bottom end 18 of the cone 12 is aligned with and is coextensive with the peripheral edge 44 of the base 38. The bottom surface 42 of the base 38 is textured to frictionally engage the support surface 14 thereby inhibiting the base 38 from sliding on the support surface 14.

A net 46 is coupled to the base 38 and the net 46 is positionable to close the entry opening 24 in the cone 12 thereby inhibiting the animal 26 from exiting the cone 12. The net 46 is additionally positionable to expose the entry opening 24. The net 46 has a bottom edge 48 and an outer edge 50, and the outer edge 50 curves upwardly from the bottom edge 48. The bottom edge 48 of the net 46 is coupled to the top surface 40 of the base 38. Additionally, the outer edge 50 is coextensive with a bounding edge 52 of the entry opening 24 when the net 46 is positioned to close the entry opening 24. The net 46 is comprised of a fluid permeable material wherein the net 46 is configured to facilitate air to pass therethrough.

A fastener 54 is provided that has a first portion 55 that is coupled to and is coextensive with the outer edge 50 of the net 46. The fastener 54 has a second portion 56 that is coupled to and is coextensive with the bounding edge 52 of the entry opening 24. The first portion 55 releasably engages the second portion 56 for retaining the net 46 to close the entry opening 24. Moreover, the fastener 54 may be a zipper or other similar type of releasable fastener 54.

A pair of straps 58 is each coupled to and extends laterally away from the base 38 and each of the straps 58 is matable to each other. Each of the straps 58 is extended over the cone 12 when the member 30 is collapsed upon itself thereby retaining the cone 12 in the collapsed position. Each of the straps 58 is positioned in the peripheral edge 44 of the base 38 and the straps 58 is positioned on opposite sides of the base 38 from each other. Each of the straps 58 has a distal end 60 with respect to the base 38 and the distal end 60 of each of the straps 58 is matable to each other. Each of the straps 58 may have a respective one of a pair of hook and loop fastener 54 being attached thereto thereby facilitating the straps 58 to be matable to each other.

Figure 5:
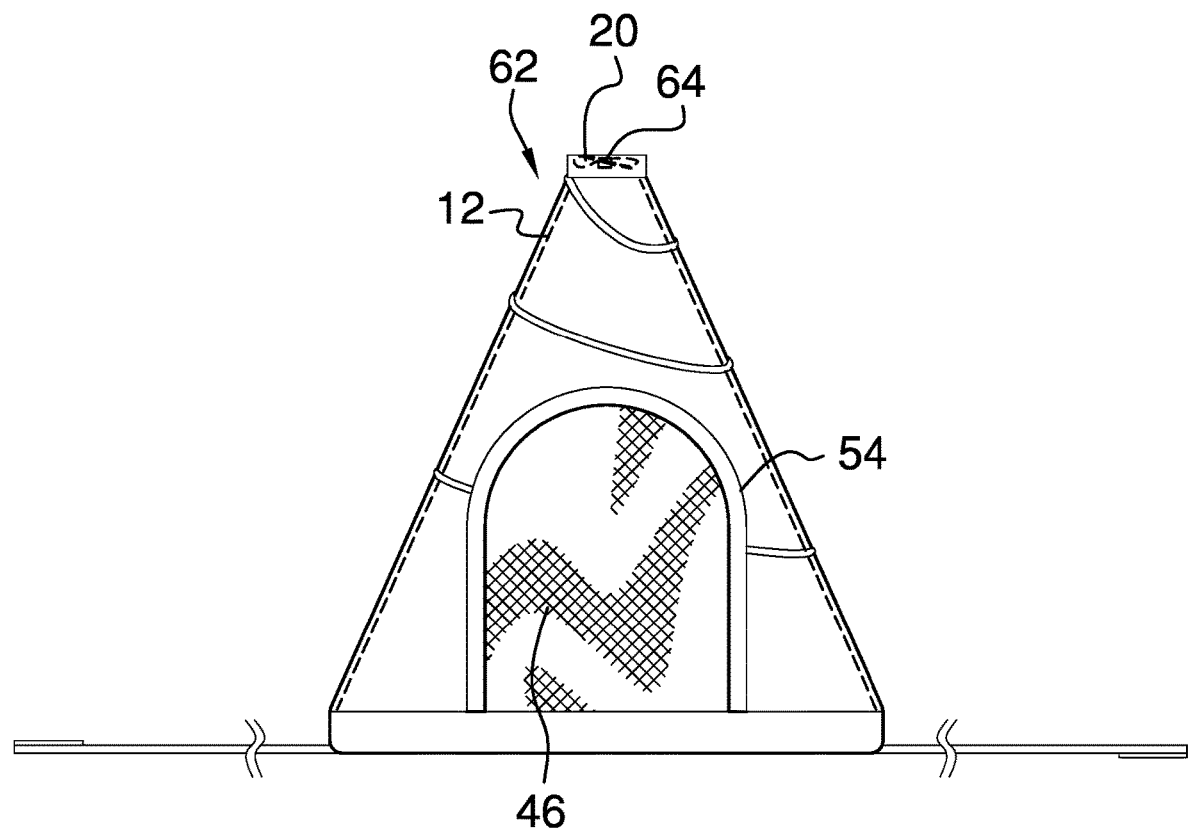
FIG. 5 is a front view of an alternative embodiment of the disclosure.
Figure 6:
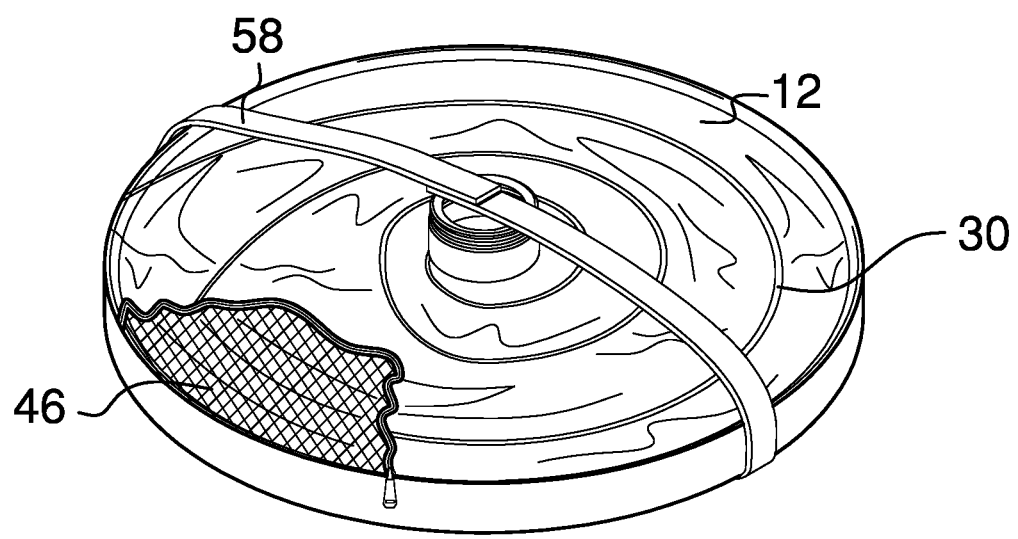
FIG. 6 is a top perspective view of an embodiment of the disclosure in a collapsed position.

In an alternative embodiment 62 as is most clearly shown in FIG. 5, a blower 64 may be coupled to the cone 12 and the blower 64 may be positioned in the top end 20 of the cone 12. Thus, the blower 64 may blow air into the cone 12 when the blower 64 is turned on for drying the animal 26. The blower 64 in the alternative embodiment may comprise an electric fan or other similar type of blower. Continuing in the alternative embodiment 62, the fastener 54 may comprise a hook and loop fastener or the like.

In use, the base 38 is positioned on the support surface 14 and the straps 58 are released from each other thereby facilitating the cone 12 to spring upwardly from the base 38. The animal 26 is positioned in the cone 12 through the entry opening 24 and the net 46 is closed. The blower 36 is inserted into the tube 32 and the blower 36 is turned on. In this way the animal 26 can be dried when the animal 26 has been bathed. The net 46 is opened when the animal 26 is dry thereby facilitating the animal 26 to exit the cone 12. The member 30 is collapsed upon itself, the straps 58 are extended over the cone 12 and the straps 58 are mated to each other to retain the cone 12 in the collapsed position for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal drying assembly being configured to have an animal placed therein after bathing the animal and having air being blown on the animal for drying the animal, said assembly comprising:
    a cone being positionable on a support surface having said cone being vertically oriented, said cone having an air opening extending therein wherein said air opening is configured to pass air into said cone;
    a member being coupled to said cone, said member being vertically coiled around said cone, said member being comprised of a resiliently deformable material, said member being biased to spring upwardly thereby positioning said cone in a deployed position having said cone extending upwardly from the support surface wherein said cone is configured to have the animal positioned therein, said member being collapsible upon itself thereby facilitating said cone to be positioned in a collapsed position for storage;
    a tube being coupled to said cone, said tube being aligned with said air opening wherein said tube is configured to pass air into said top end;
    a blower being insertable into said tube wherein said blower is configured to blow air into said cone for drying the animal;
    a base being positionable on the support surface wherein said base is configured to have the animal stand thereupon, said cone being coupled to and extending upwardly from said base; and
    a net being coupled to said base, said net being positionable to close an entry opening in said cone wherein said net is configured to inhibit the animal from exiting said cone, said net being positionable to expose said entry opening.

2. The assembly according to claim 1, wherein:
    said cone has a bottom end, a top end and an outer wall extending therebetween;
    said top end is open to define said air opening in said top end, said outer wall angling outwardly between said top and bottom ends;

said outer wall has said entry opening extending into an interior of said cone wherein said entry opening is configured to facilitate an animal to enter said cone, said outer wall having an outside surface; and said member is bonded to said outside surface of said outer wall of said cone, said member coiling between said bottom and top ends of said cone.

3. The assembly according to claim 2, wherein said tube has a distal end with respect to said top end, said tube curving between said top end of said cone and said distal end.

4. The assembly according to claim 3, wherein said blower is insertable into said distal end of said tube.

5. The assembly according to claim 2, wherein said base has a top surface, a bottom surface and a peripheral edge extending therebetween, said peripheral edge being continuously arcuate such that said base has a circular shape, said bottom end of said cone being attached to said top surface of said base, said bottom end of said cone being aligned with and being coextensive with said peripheral edge of said base, said bottom surface of said base being textured wherein said bottom surface of said base is configured to frictionally engage the support surface thereby inhibiting said base from sliding on the support surface.

6. The assembly according to claim 5, wherein said net has a bottom edge and an outer edge, said outer edge curving upwardly from said bottom edge, said bottom edge of said net being coupled to said top surface of said base, said outer edge being coextensive with a bounding edge of said entry opening when said net is positioned to close said entry opening, said net being comprised of a fluid permeable material wherein said net is configured to facilitate air to pass therethrough.

7. The assembly according to claim 6, further comprising a fastener having a first portion being coupled to and being coextensive with said outer edge of said net, said fastener having a second portion being coupled to and being coextensive with said bounding edge of said entry opening, said first portion releasably engaging said second portion for retaining said net to close said entry opening.

8. The assembly according to claim 5, further comprising a pair of straps, each of said straps being coupled to and extending laterally away from said base, each of said straps being ratable to each other, each of said straps being extended over said cone when said member is collapsed upon itself thereby retaining said cone in said collapsed position, each of said straps being positioned in said peripheral edge of said base, said straps being positioned on opposite sides of said base from each other, each of said straps having a distal end with respect to said base, said distal end of each of said straps being matable to each other.

9. An animal drying assembly being configured to have an animal placed therein after bathing the animal and having air being blown on the animal for drying the animal, said assembly comprising:

a cone being positionable on a support surface having said cone being vertically oriented, said cone having an air opening extending therein wherein said air opening is configured to pass air into said cone, said cone having a bottom end, a top end and an outer wall extending therebetween, said top end being open to define said air opening in said top end, said outer wall angling outwardly between said top and bottom ends, said outer wall having an entry opening extending into an interior of said cone wherein said entry opening is configured to facilitate an animal to enter said cone, said outer wall having an outside surface;

a member being coupled to said cone, said member being vertically coiled around said cone, said member being comprised of a resiliently deformable material, said member being biased to spring upwardly thereby positioning said cone in a deployed position having said cone extending upwardly from the support surface wherein said cone is configured to have the animal positioned therein, said member being collapsible upon itself thereby facilitating said cone to be positioned in a collapsed position for storage, said member being bonded to said outside surface of said outer wall of said cone, said member coiling between said bottom and top ends of said cone;

a tube being coupled to said cone, said tube being aligned with said air opening wherein said tube is configured to pass air into said top end, said tube having a distal end with respect to said top end, said tube curving between said top end of said cone and said distal end;

a blower being insertable into said tube wherein said blower is configured to blow air into said cone for drying the animal, said blower being insertable into said distal end of said tube;

a base being positionable on the support surface wherein said base is configured to have the animal stand thereupon, said cone being coupled to and extending upwardly from said base, said base having a top surface, a bottom surface and a peripheral edge extending therebetween, said peripheral edge being continuously arcuate such that said base has a circular shape, said bottom end of said cone being attached to said top surface of said base, said bottom end of said cone being aligned with and being coextensive with said peripheral edge of said base, said bottom surface of said base being textured wherein said bottom surface of said base is configured to frictionally engage the support surface thereby inhibiting said base from sliding on the support surface;

a net being coupled to said base, said net being positionable to close said entry opening in said cone wherein said net is configured to inhibit the animal from exiting said cone, said net being positionable to expose said entry opening, said net having a bottom edge and an outer edge, said outer edge curving upwardly from said bottom edge, said bottom edge of said net being coupled to said top surface of said base, said outer edge being coextensive with a bounding edge of said entry opening when said net is positioned to close said entry opening, said net being comprised of a fluid permeable material wherein said net is configured to facilitate air to pass therethrough;

a fastener having a first portion being coupled to and being coextensive with said outer edge of said net, said fastener having a second portion being coupled to and being coextensive with said bounding edge of said entry opening, said first portion releasably engaging said second portion for retaining said net to close said entry opening; and a pair of straps, each of said straps being coupled to and extending laterally away from said base, each of said straps being matable to each other, each of said straps being extended over said cone when said member is collapsed upon itself thereby retaining said cone in said collapsed position, each of said straps being positioned in said peripheral edge of said base, said straps being positioned on opposite sides of said base from each other, each of said straps having a distal end with respect to said base, said distal end of each of said straps being eatable to each other.

10. The assembly according to claim 9, further comprising said blower being integrated into said top end of said cone wherein said blower is configured to blow air into said cone when said blower is turned on for drying the animal.

\* \* \* \* \*